US006602175B2

(12) United States Patent
Zahn

(10) Patent No.: US 6,602,175 B2
(45) Date of Patent: Aug. 5, 2003

(54) PROCESS FOR MANUFACTURING BROCHURES AND DEVICE FOR PERFORMING THE PROCESS

(75) Inventor: Thomas Zahn, Herford (DE)

(73) Assignee: Kolbus GmbH & Co. KG, Rahden (DE)

( * ) Notice: Subject to any disclaimer, the term of this patent is extended or adjusted under 35 U.S.C. 154(b) by 144 days.

(21) Appl. No.: 09/733,343

(22) Filed: Dec. 8, 2000

(65) Prior Publication Data

US 2001/0004625 A1 Jun. 21, 2001

(30) Foreign Application Priority Data

Dec. 10, 1999 (DE) ........................................ 199 59 745

(51) Int. Cl.[7] ................................................ B65G 53/00
(52) U.S. Cl. ....................... 493/378; 493/419; 493/374; 493/379; 493/947; 83/934
(58) Field of Search .......................... 493/89, 374, 378, 493/379, 947, 419; 412/1, 4, 5, 6, 17, 19, 24; 83/934

(56) References Cited

U.S. PATENT DOCUMENTS 4,091,487 A * 5/1978 Axelrod ..................... 281/21.1
4,341,401 A * 7/1982 Arntzen ........................ 281/34
4,511,131 A * 4/1985 Raybuck .................. 270/52.17
5,417,535 A * 5/1995 Andjelic et al. .............. 412/16
5,498,112 A * 3/1996 Schwettmann et al. ....... 412/19
5,868,539 A * 2/1999 Rathert ...................... 281/21.1
6,193,458 B1 * 2/2001 Marsh ........................... 412/1
6,354,582 B1 * 3/2002 Hafer et al. ............. 270/58.07

* cited by examiner

*Primary Examiner*—Rinaldi I. Rada
*Assistant Examiner*—Brian Nash
(74) *Attorney, Agent, or Firm*—Alix, Yale & Ristas, LLP

(57) ABSTRACT

A process for manufacturing brochures, books or like products, having a jacket constructed with turned-in flaps, the folded edges of the flaps preferably protruding beyond the front cut of the block or terminating flush with the latter in which (a) leaves or folded sheets are gathered in a gathering machine (3) to form a block (1), (b) the block (1) is fed to a first cutting station (A) and trimmed on the front side (1*a*) and (c) then is transferred into an adhesive binding machine (4) in which the leaves or folded sheets are joined by the application of an adhesive, (d) the block (1) is cased into a jacket and (e) the block (1), provided with a jacket, is fed to a second cutting station (B) where the product (2) is trimmed at the top and bottom sides (2*a,* 2*b*).

12 Claims, 1 Drawing Sheet

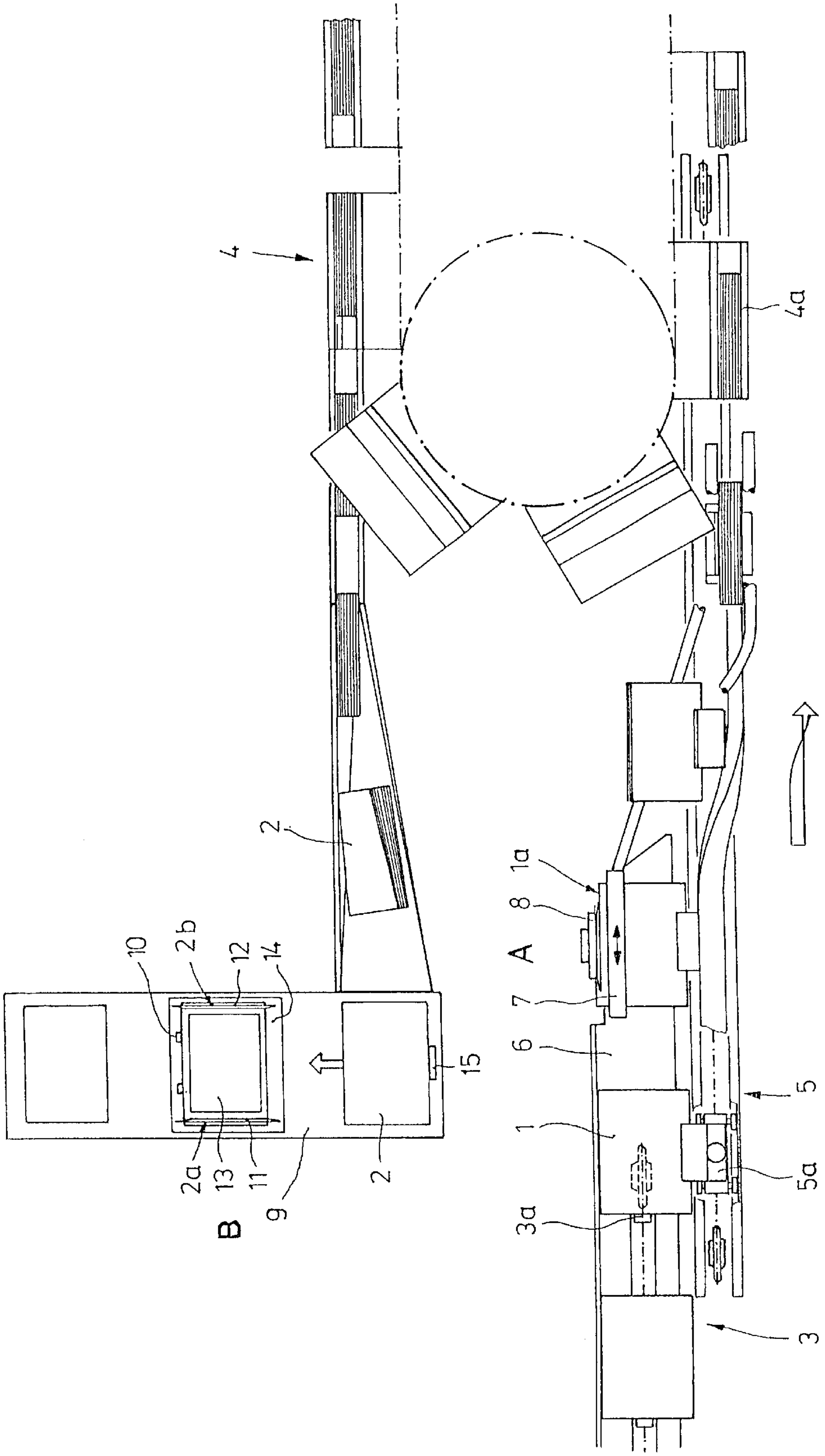
4
4a
2
1a
8
A
7
6
1
3a
5
5a
3
10
2b
12
14
15
2a
13
11
9
2
B

PROCESS FOR MANUFACTURING BROCHURES AND DEVICE FOR PERFORMING THE PROCESS

BACKGROUND OF THE INVENTION

The invention relates to a process, and to a device for performing the process, for manufacturing brochures, books or like products, having a jacket constructed with turned-in flaps, the folded edges of the said flaps preferably protruding beyond the front cut of the block or terminating flush with the latter.

In the manufacture of brochures having a jacket with turned-in flaps, the trimming of the front side takes place, on the one hand, in a three-blade cutting machine subsequently to the adhesive binding operation, the block protruding at least 1 mm beyond the jacket at the front cut. On the other hand, the block can also be trimmed at the beginning, before the attachment of the jacket, the so-called "casing-in" operation, a fact, which necessitates a second run through the adhesive binding machine. In this process, the folded edges of the flaps terminate flush with the front cut, or protrude slightly beyond the front cut of the block. However, a second run-through makes production substantially more expensive.

SUMMARY OF THE INVENTION

The object of the invention is to provide a process and a device for manufacturing brochures, books or like products, of the generic type, with the aid of which the products can be manufactured more economically.

To that end, in the process according to the invention leaves or folded sheets are gathered in a gathering machine to form a block, the block is fed to a cutting station and trimmed on the front side and is transferred into an adhesive binding machine in which the leaves or folded sheets are joined, by the application of an adhesive to the previously processed block back. The block is cased into a jacket, and the block, provided with a jacket, is fed to a second cutting station and the product is trimmed at the top and bottom sides.

For the purpose of performing the process, there is provided, according to the invention, a first cutting station for trimming the front side, which cutting station is disposed between the gathering machine and the adhesive binding machine; a transport system, which holds the block in a force-locking manner, for taking over the said block from the gathering machine and for transporting the said block through the cutting station and for transferring the said block, which has been trimmed on the front side, into the adhesive binding machine; and a second cutting station for trimming the top and bottom sides of the product, which cutting station is disposed behind the adhesive binding machine.

Advantageous features of the process and device emerge from the dependent claims.

BRIEF DESCRIPTION OF THE DRAWING

The invention will be described below with reference to the accompanying drawing which is a diagrammatic view illustrating the apparatus and method in accordance with the present invention.

DESCRIPTION OF THE PREFERRED EMBODIMENTS

The process and device according to the invention indicate a way of manufacturing brochures, books or like products having a jacket with turned-in flaps, the folded edges of the flaps protruding beyond the front cut of the block or terminating flush with the latter, in one run-through and thus more economically.

The invention will be described below with the aid of an exemplified embodiment and with reference to the diagrammatic drawing.

As the linking member between an adhesive binding machine 4, having a multitude of block tongs which are capable of continuous movement on a circulating track, and a gathering machine 3, a transport system 5 is provided which is driven cyclically synchronously with the gathering machine 3, and the adhesive binding machine 4. The transport system 5 takes over the loose folded sheets, which have been gathered to form an unbound block 1, from the transporters 3*a* of the gathering machine 3 and transports them, while holding them in a force-locking manner, through a first cutting station A, which is disposed between the gathering machine 3 and the adhesive binding machine 4, and in which the block 1, which is supported while lying flat on a table 6 and is counter-held by a holding-down device 7 driven in a co-rotating manner, is finish-trimmed on the front side 1*a* while running through. The cutting station A is constructed as a rotary cutter 8, which works on the shearing principle and has a rotating upper blade which effects cutting against a likewise rotating lower blade. As the process continues, the block 1 which has been trimmed on the front side la passes, while continuously held in a force-locking manner by the transport system 5, into the adhesive binding machine 4, where it is taken over by block tongs 4*a*.

The transport system 5 consists of a multitude of block tongs 5*a* at equal mutual intervals from one another, which are articulated on a chain running around deflecting chain wheels. Reference is hereby made to Patent Specification DE 34 13 222 by the same applicant, from which details of such a transport system are known.

In the adhesive binding machine 4, the folded sheets are joined, by the application of an adhesive to the previously processed block back, and the block 1 is cased into a jacket with turned-in flaps, the folded edges of which protrude beyond the front cut 1*a* of the block 1. The block 1, which has been provided with a jacket and has now become the brochure 2, finally passes, via the delivery apparatus of the adhesive binding machine 4 and while lying flat, onto a supporting table 9, which leads away at right angles, for onward transport and cyclically synchronous in-feed into a second cutting station B by means of a slide 15 which engages behind the brochure 2. In the cutting station B, the brochure 2 is positioned on straightening elements 10 and is finish-trimmed on the top and bottom sides 2*a*, 2*b* while at a standstill. The second cutting station B may be constructed as a known cutting machine which works on the blade-type cutting principle and has two lateral blades 11, 12, which act against cutting strips in an obliquely swinging cut, and a format plate 13 which keeps the brochure 2 pressed on a cutting table 14.

Thus, the aforementioned object of the invention is most effectively attained. Although a single preferred embodiment of invention has been disclosed and described in detail herein, it should be understood that this invention is in no sense limit thereby and its scope is to be determined by that of the appended claims.

What is claimed:

1. A process for manufacturing brochures having a jacket constructed with turned in flaps, the folded edges of said flaps preferably protruding beyond the front cut of the block or termining flush with the block, comprising:

gathering a plurality of leaves or folded sheets in a gathering machine to form a block, said block having a front side and top and bottom sides;

feeding said block to a first cutting station;

trimming said block on the front side;

transferring said block from the first cutting station into an adhesieve binding machine in which the block is cased into a jacket to form a brochure having respective top and bottom sides;

feeding the brochure to a second cutting station; and trimming the brochure at the top and bottom sides.

2. A process in accordance with claim 1, wherein the transferring includes holding the trimmed block in a force-locking manner while the block is transferred into the adhesive binding machine.

3. A process in accordance with claim 1, wherein the trimming of the block on the front side occurs while the block is in motion.

4. A process in accordance with claim 1, wherein the trimming of the block on the front side occurs while the block is stationary.

5. A process in accordance with claim 2, wherein the trimming of the block on the front side occurs while the block is in motion.

6. A process in accordance with claim 2, wherein the trimming of the block on the front side occurs while the block is stationary.

7. A process for manufacturing brochures having a jacket constructed with turned-in flaps, the folded edges of the flaps preferably protruding beyond the front cut of the block or terminating flush with the block, comprising:

gathering a plurality of leaves or folded sheets in a gathering machine to form a block, said block having front and back sides, and top and bottom sides;

feeding said block to a first cutting station;

at the first cutting station, trimming said block on the front side;

transferring said block having a trimmed front side into an adhesive binding machine in which the leaves or folded sheets are joined, by the application of an adhesive, at the back side;

casing the block into a jacket to form a brochure;

feeding the brochure to a second cutting station; and at the second cutting station trimming the brochure along the top and bottom sides of the block.

8. A process in accordance with claim 7, wherein said transferring of said block to an adhesive binding machine includes holding the block in a force-locking manner from a gathering machine, through the first cutting station, to said adhesive binding machine.

9. A process in accordance with claim 7, wherein the trimming of the block at the first cutting station occurs while the block is in motion.

10. A process in accordance with claim 7, wherein the trimming of the block at the first cutting station occurs while the block is stationary.

11. A process according to claim 8, wherein the trimming of the brochure is performed downstream of the adhesive binding machine.

12. A process in accordance with claim 11, wherein, following the casing of the block into a jacket to form a brochure, the brochure is conveyed in a first direction with the front side of the block facing vertically upward;

before entry into the second cutting station the conveyed brochure is reoriented to lie flat with the front side facing horizontally; and the brochure is conveyed through the second cutting station along a second direction which is transverse to said first direction.

* * * * *